United States Patent
Schlecht et al.

(10) Patent No.: US 12,298,260 B2
(45) Date of Patent: May 13, 2025

(54) CUSTOMIZABLE AXES OF ROTATION FOR INDUSTRIAL RADIOGRAPHY SYSTEMS

(71) Applicant: ILLINOIS TOOL WORKS INC., Glenview, IL (US)

(72) Inventors: Joseph Schlecht, Edina, MN (US); Caleb Nelson Hay, Minneapolis, MN (US); Eric Ferley, Minneapolis, MN (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 372 days.

(21) Appl. No.: 17/370,318

(22) Filed: Jul. 8, 2021

(65) Prior Publication Data
US 2023/0010730 A1 Jan. 12, 2023

(51) Int. Cl.
*G01N 23/04* (2018.01)
*G01N 23/083* (2018.01)
*G01N 23/18* (2018.01)

(52) U.S. Cl.
CPC ............ *G01N 23/18* (2013.01); *G01N 23/04* (2013.01); *G01N 23/083* (2013.01); *G01N 2223/1016* (2013.01); *G01N 2223/306* (2013.01); *G01N 2223/32* (2013.01); *G01N 2223/321* (2013.01); *G01N 2223/3306* (2013.01); *G01N 2223/3307* (2013.01); *G01N 2223/401* (2013.01);
(Continued)

(58) Field of Classification Search
None
See application file for complete search history.

(56) References Cited

U.S. PATENT DOCUMENTS 7,522,700 B2 * 4/2009 Bavendiek ............. G01N 23/04
378/205
7,714,304 B2 * 5/2010 Poglitsch ............. G01N 23/046
378/20
(Continued)

FOREIGN PATENT DOCUMENTS

DE 102008044437 A1 * 12/2009 ............. G01B 15/04
EP 1749190 B1 * 5/2015 ........... A61B 6/4417
(Continued)

OTHER PUBLICATIONS

CT GOM 5 Axis Kinematics Video, https://www.gom.com/uploads/tx_livideo/CT_GOM_5_AXIS_KINEMATICS_1080p.mp4 uploaded on Jun. 25, 2021, 9 pages.
(Continued)

*Primary Examiner* — Thomas R Artman
(74) *Attorney, Agent, or Firm* — McAndrews, Held & Malloy, Ltd.

(57) ABSTRACT

Described herein are examples of industrial radiography systems that enable rotation of a part about a custom axis that is offset from an actual rotation axis of a rotatable fixture that retains the part. This may be valuable in situations where it is difficult, impractical, and/or impossible to align the center of the part with the center of the rotatable fixture. In some examples, the custom axis rotation may be implemented on existing radiography machines, without requiring physical alteration of the radiography machines, integration of new components into the radiography machines, and/or risk of instability to the part and/or radiography machines.

10 Claims, 7 Drawing Sheets

(52) U.S. Cl.
   CPC . *G01N 2223/406* (2013.01); *G01N 2223/419* (2013.01); *G01N 2223/646* (2013.01)

(56) References Cited

U.S. PATENT DOCUMENTS

| | | | |
|---|---|---|---|
| 8,907,303 B2* | 12/2014 | Momoi | H01J 37/20 |
| | | | 250/306 |
| 9,025,855 B1 | 5/2015 | Christoph | |
| 10,190,996 B2* | 1/2019 | Matsumiya | G01N 23/046 |
| 10,209,204 B2 | 2/2019 | Mecke | |
| 10,247,682 B2 | 4/2019 | Schlecht et al. | |
| 10,983,072 B2* | 4/2021 | Illemann | G06T 11/005 |
| 11,229,410 B2* | 1/2022 | Turner | A61B 6/4458 |
| 2006/0245542 A1 | 11/2006 | Bavendiek | |
| 2008/0217559 A1* | 9/2008 | Poglitsch | G01N 23/046 |
| | | | 250/491.1 |
| 2010/0118027 A1* | 5/2010 | Weiss | G01N 23/046 |
| | | | 345/419 |
| 2016/0054239 A1* | 2/2016 | Schlecht | G01V 5/005 |
| | | | 378/11 |
| 2016/0238541 A1* | 8/2016 | Mecke | G01N 23/04 |
| 2016/0305894 A1 | 10/2016 | Matsumiya | |
| 2020/0003704 A1* | 1/2020 | Illemann | G06T 11/005 |
| 2023/0010730 A1* | 1/2023 | Schlecht | G01N 23/04 |
| 2023/0083059 A1* | 3/2023 | Lemmer | G01N 23/04 |
| | | | 378/62 |

FOREIGN PATENT DOCUMENTS

| | | |
|---|---|---|
| GB | 2534509 | 7/2016 |
| WO | 2014165455 | 10/2014 |

OTHER PUBLICATIONS

Int'l Search Report and Written Opinion AppIn No. PCT/US2022/033756 mailed Sep. 5, 2022.

* cited by examiner

CUSTOMIZABLE AXES OF ROTATION FOR INDUSTRIAL RADIOGRAPHY SYSTEMS

TECHNICAL FIELD

The present disclosure generally relates to industrial radiography systems and, more particularly, to customizable axes of rotation for industrial radiography systems.

BACKGROUND

X-ray radiography is sometimes used to inspect parts used in industrial applications, such as, for example, aerospace, automotive, electronic, medical, pharmaceutical, military, and/or defense applications. Parts may be rotated in order to perform radiography scans at different angles. The X-ray images generated via the radiography scans can be used to check the part(s) for cracks, flaws, and/or defects that may not normally be visible to the human eye.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to customizable axes of rotation for industrial radiography systems, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

The figures are not necessarily to scale. Where appropriate, the same or similar reference numerals are used in the figures to refer to similar or identical elements. For example, reference numerals utilizing lettering (e.g., radiography machine 100a, radiography machine 100b) refer to instances of the same reference numeral that does not have the lettering (e.g., radiography machines 100).

DETAILED DESCRIPTION

Some examples of the present disclosure relate to x-ray radiography systems that allow a user to define a custom (and/or virtual) axis of rotation that is offset from an actual axis of rotation of a rotatable fixture.

In conventional x-ray radiography systems, an industrial part may be rotated via a rotatable fixture to present the part at different orientations with respect to an x-ray radiation emitter and/or detector. Radiation detected by the detector may be used to generate two-dimensional (2D) x-ray images, which can be analyzed to check the part for cracks, flaws, and/or defects. X-ray images captured at different orientations allow inspection at different perspectives, and may reveal defects that would otherwise remain hidden. Additionally, a three dimensional (3D) image of the part may be generated using multiple different x-ray images of the part at different orientations.

However, if the part is not centered with respect to the rotatable fixture, rotating the fixture will result in off-center rotation of the part. Off-center rotation of the part may, in turn, result in off-center 2D X-ray images that are more difficult to analyze and/or combine into a 3D image. While in some situation it might be relatively trivial to center the part with respect to the fixture, there are other situations where it may be impossible or impractical to center the part with respect to the fixture.

Though some solutions to this problem have been proposed, the solutions tend to focus on redesigning the physical structure of the rotatable fixture, which can be expensive, complicated, difficult to integrate with existing systems, and/or result in instability of the part and/or fixture. The radiography systems discussed below instead focus on dynamically translating the position of the rotatable fixture during rotation using programmatic control, so that the part is rotated about its own center (and/or some other custom axis), rather than the center of the fixture. This solution can be applied to existing systems without requiring physical alteration of existing rotatable fixtures, integration of new components, or risk of part and/or fixture instability.

Some examples of the present disclosure relate to a non-transitory computer readable medium comprising machine readable instructions which, when executed by a processor, cause the processor to: define a custom axis of rotation in an industrial radiography system, the custom axis being offset from an actual axis of rotation about which a rotatable fixture configured to retain an object is configured to rotate; determine an offset vector extending between the custom axis of rotation and the actual axis of rotation along a plane that is normal to both the custom axis of rotation and the actual axis of rotation; identify an angle to which, or an angular velocity at which, to rotate the object around the custom axis; determine a translation of the rotatable fixture in the plane normal to the custom axis of rotation based on the offset vector and the angle, or the offset vector and the angular velocity; command a support structure to move the rotatable fixture in the plane based on the translation; and command the rotatable fixture to rotate around the actual axis based on the angle or the angular velocity, wherein translation of the rotatable fixture in the plane, and rotation of the rotatable fixture around the actual axis, results in an effective rotation of the object around the custom axis.

In some examples, the custom axis of rotation is parallel to the actual axis of rotation. In some examples, the offset vector comprises an offset distance and an offset direction, and the support structure and rotatable fixture are commanded to move such that the offset distance remains approximately constant during movement. In some examples, the translation comprises a new coordinate to which the rotatable fixture will be moved, a distance and direction of movement of the rotatable fixture, or a direction and speed of movement of the rotatable fixture.

In some examples, the non-transitory computer readable medium further comprises machine readable instructions which, when executed by a processor, cause the processor to: determine a first translation of the rotatable fixture in a first axis based on the angle and the offset vector, the first axis being perpendicular to the custom axis of rotation; and determine a second translation of the rotatable platform in a second axis based on the angle and the offset vector, the second axis being perpendicular to the custom axis of rotation, the translation comprising the first translation and the second translation. In some examples, the second axis is perpendicular to the custom axis and the first axis. In some examples, the offset vector comprises an offset distance and an offset direction, and the non-transitory computer readable medium further comprises machine readable instructions which, when executed by a processor, cause the processor to command a radiation emitter of the industrial radiography system to direct radiation through the object and onto a radiation detector of the industrial radiography system at a plurality of different times, the offset distance remaining constant at each of the plurality of different times.

In some examples, the non-transitory computer readable medium further comprising machine readable instructions which, when executed by a processor, cause the processor to command a radiation emitter of the industrial radiography system to direct radiation through the object and onto a radiation detector of the industrial radiography system. In some examples, the non-transitory computer readable medium further comprises machine readable instructions which, when executed by a processor, cause the processor to generate a two dimensional or three dimensional image of the object based on the radiation detected by the radiation detector. In some examples, defining the custom axis of rotation comprises: sending a first signal to a radiation emitter of the industrial radiography system, the first signal being representative of a command to direct first radiation through the object and onto a radiation detector of the industrial radiography system; generating a first image of the object based on the first radiation detected by the radiation detector; receiving a first selection of a first point in the first image; commanding the rotatable fixture to rotate; sending a second signal to the radiation emitter, the second signal being representative of a command to direct second radiation through the object and onto the radiation detector; generating a second image of the object based on the second radiation detected by the radiation detector; receiving a second selection of a second point in the second image; identifying an intersection of a first plane defined by the first point and the radiation emitter and a second plane defined by the second point and the radiation emitter, the first plane and second plane being parallel to the actual axis of rotation; and defining the custom axis of rotation as a line extending through the intersection, the line being parallel to the actual axis of rotation.

Some examples of the present disclosure relate to a method of rotating an object around a custom axis of rotation in an industrial radiography system, the method comprising: defining the custom axis of rotation, the custom axis being offset from an actual axis of rotation about which a rotatable fixture configured to retain the object is configured to rotate; determining an offset vector extending between the custom axis of rotation and the actual axis of rotation along a plane that is normal to both the custom axis of rotation and the actual axis of rotation; identifying an angle to which, or an angular velocity at which, to rotate the object about the custom axis; determining a translation of the rotatable fixture in the plane normal to the custom axis of rotation based on the offset vector and the angle, or the offset vector and the angular velocity; moving the rotatable fixture in the plane based on the translation; and rotating the rotatable fixture around the actual axis based on the angle or the angular velocity, wherein translation of the rotatable fixture in the plane, and rotation of the rotatable fixture around the actual axis, results in an effective rotation of the object around the custom axis.

In some examples, the custom axis of rotation is parallel to the actual axis of rotation. In some examples, the offset vector comprises an offset distance and an offset direction. In some examples, the rotatable fixture is moved such that the offset distance remains approximately constant.

In some examples, moving the rotatable fixture in the plane comprises moving the rotatable fixture via a support structure that retains the rotatable fixture. In some examples, the method further comprises directing radiation from a radiation emitter of the industrial radiography system, through the object, to a radiation detector of the industrial radiography system. In some examples, the radiation is X-ray radiation.

In some examples, the method further comprises generating a two dimensional image of the object based on the radiation detected by the radiation detector. In some examples, the method further comprises generating a three dimensional image of the object based on the two dimensional image of the object and a plurality of other two dimensional images of the object. In some examples, defining the custom axis of rotation comprises: directing first radiation from a radiation emitter of the industrial radiography system, through the object, to a radiation detector of the industrial radiography system; generating a first image of the of the object based on the first radiation detected by the radiation detector; receiving a first selection of a first point in the first image; rotating the rotatable fixture; directing second radiation through the object and onto the radiation detector; generating a second image of the object based on the second radiation detected by the radiation detector; receiving a second selection of a second point in the second image; identifying an intersection of a first plane defined by the first point and the radiation emitter and a second plane defined by the second point and the radiation emitter, the first plane and second plane being parallel to the actual axis of rotation; and defining the custom axis of rotation as a line extending through the intersection, the line being parallel to the actual axis of rotation.

Figure 1A:
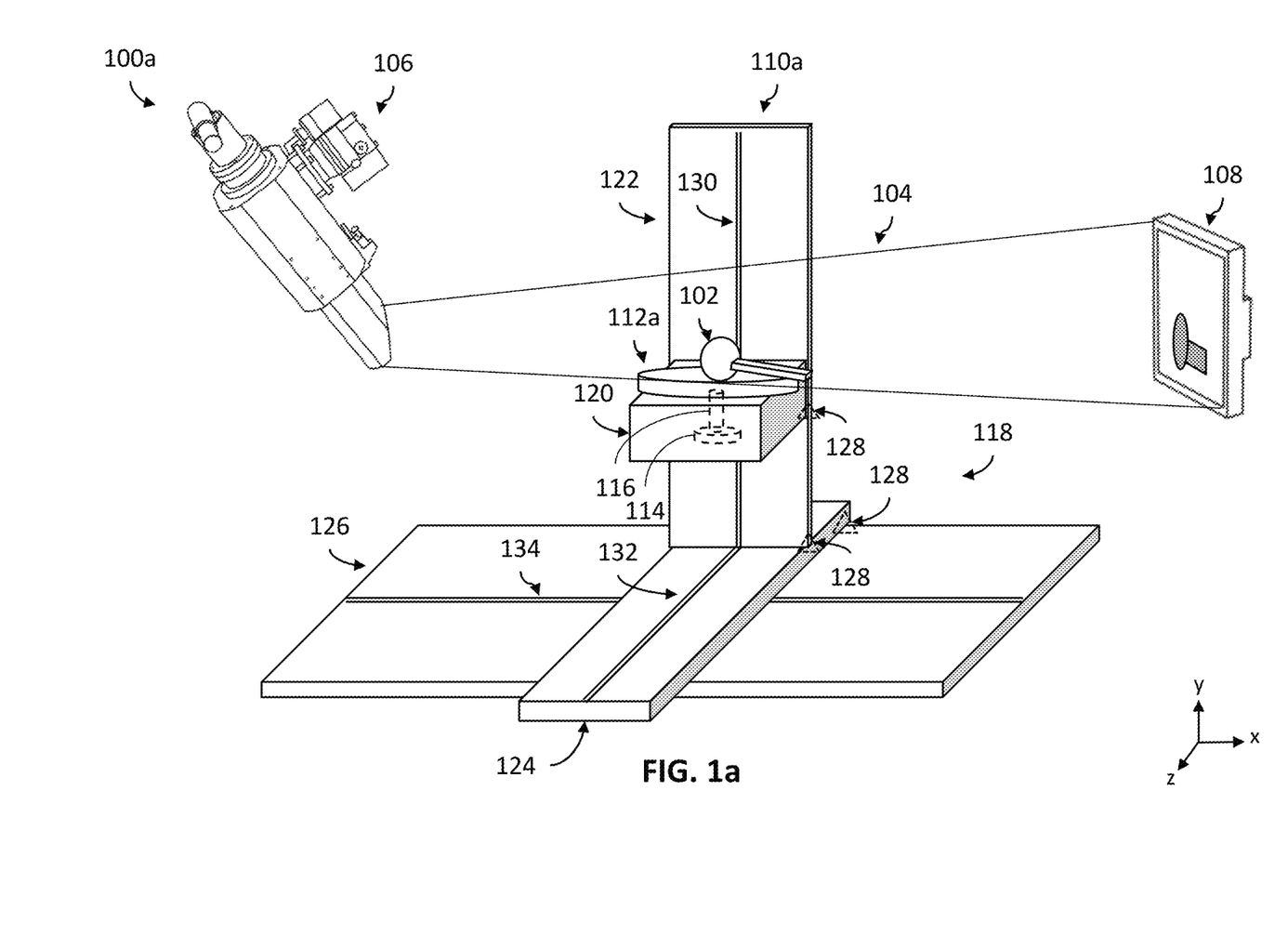
FIG. 1a shows an example industrial x-ray radiography machine, in accordance with aspects of this disclosure.

FIG. 1a shows an example industrial X-ray radiography machine 100a. The example X-ray radiography machine 100a may be used to perform non-destructive testing (NDT), digital radiography (DR) scans, computerized tomography (CT) scans, and/or other applications on a part 102. In some examples, the part 102 may be an industrial component and/or an assembly of components (e.g., an engine cast, microchip, bolt, etc.). While primarily discussed in terms of X-rays for the sake of simplicity, in some examples, the industrial X-ray radiography machines 100 discussed herein may use radiation in other wavelengths (e.g., Gamma, Neutron, etc.).

In the example of FIG. 1a, the X-ray radiography machine 100a directs X-ray radiation 104 from an X-ray emitter 106, through the part 102, to an X-ray detector 108. In some examples, the X-ray detector 108 may include a fluoroscopy detection system and/or a digital image sensor configured to receive an image indirectly via scintillation, and/or may be implemented using a sensor panel (e.g., a CCD panel, a CMOS panel, etc.) configured to receive the X-rays directly, and to generate the digital images. In some examples, the X-ray detector 108 may use a solid-state panel coupled to a scintillation screen and having pixels that correspond to portions of the scintillation screen. Example solid-state panels may include CMOS X-ray panels and/or CCD X-ray panels.

In some examples, 2D digital images (e.g., radiographic images, X-ray images, etc.) may be generated based on the X-ray radiation 104 incident on the X-ray detector 108. In some examples, the 2D images may be generated by the X-ray detector 108 itself, and/or by a computing system in communication with the X-ray detector 108. In some examples, one or more 3D images of the part 102 may be generated using multiple 2D images of the part 102. In some examples, the part 102 may be positioned at different angles with respect to the X-ray emitter 106 and/or X-ray detector 108 in order to obtain 2D images at different orientations.

In the example of FIG. 1a, a part positioner 110a retains the part 102 in the path of the X-ray radiation 104, between the X-ray emitter 106 and detector 108. In some examples, the part positioner 110a may be configured to move and/or rotate the part 102 so that a desired portion and/or orientation of the part 102 is located in the path of the X-ray radiation 104. As shown, the part positioner 110a includes a rotatable fixture 112a upon which the part 102 is positioned.

In the example of FIG. 1a, the rotatable fixture 112a is a circular plate. In some examples, the rotatable fixture 112a may alternatively, or additionally, include a clamp, clasp, gripper, and/or other retention mechanism. As shown, the rotatable fixture 112a is attached to a motor 114 via a spindle 116, through which the rotatable fixture 112a may be rotated about an axis defined by the spindle 116. In some examples, one or more alternative and/or additional rotation mechanisms may be provided.

In the example of FIG. 1a, the rotatable fixture 112a is supported by a support structure 118. The support structure 118 includes an arm 120, a pillar 122, a base 124, and a floor 126. As shown, the support structure 118 further includes actuators 128 configured to move the arm 120, pillar 122, and/or base 124.

In the example of FIG. 1a, the rotatable fixture 112 sits on (and/or is supported by) the arm 120 in such a way that the rotatable fixture 112 is secured but still able to rotate on the arm 120. The arm 120, in turn, is movably connected to pillar 122. As shown, pillar 122 has a pillar track 130 configured to guide the arm 120 for vertical movement (e.g., in the y axis) along the pillar 122.

In the example of FIG. 1a, the pillar 122 is movably connected to a base 124. The base 124 has a shelf track 132 configured to guide the pillar 122 in movement along the base 124 (e.g., in the z axis). The base 124 is movably connected to a floor 126 having a floor track 134 configured to guide the base 124 in movement along the floor 126 (e.g., in the x axis). The pillar 122, base 124, and floor 126 enable the radiography machine 100a to move the rotatable fixture 112 (and/or the part 102) in all three axes (x, y, z).

While represented with shapes in the example of FIG. 1a for the sake of simplicity, in some examples the actuators 128 may comprise mechanisms of various complexity. For example, the actuators 128 may include one or more belts, pulleys, pistons, motors, drive shafts, and/or other appropriate mechanisms. While one pillar track 130, shelf track 132, and floor track 134 are shown in the example of FIG. 1a, in some examples, there may be two or more pillar tracks 130, shelf tracks 132, and/or floor tracks 134. While described as tracks, in some examples, the pillar tracks 130, shelf tracks 132, and/or floor tracks 134 may instead, or additionally, include rails.

Figure 1B:
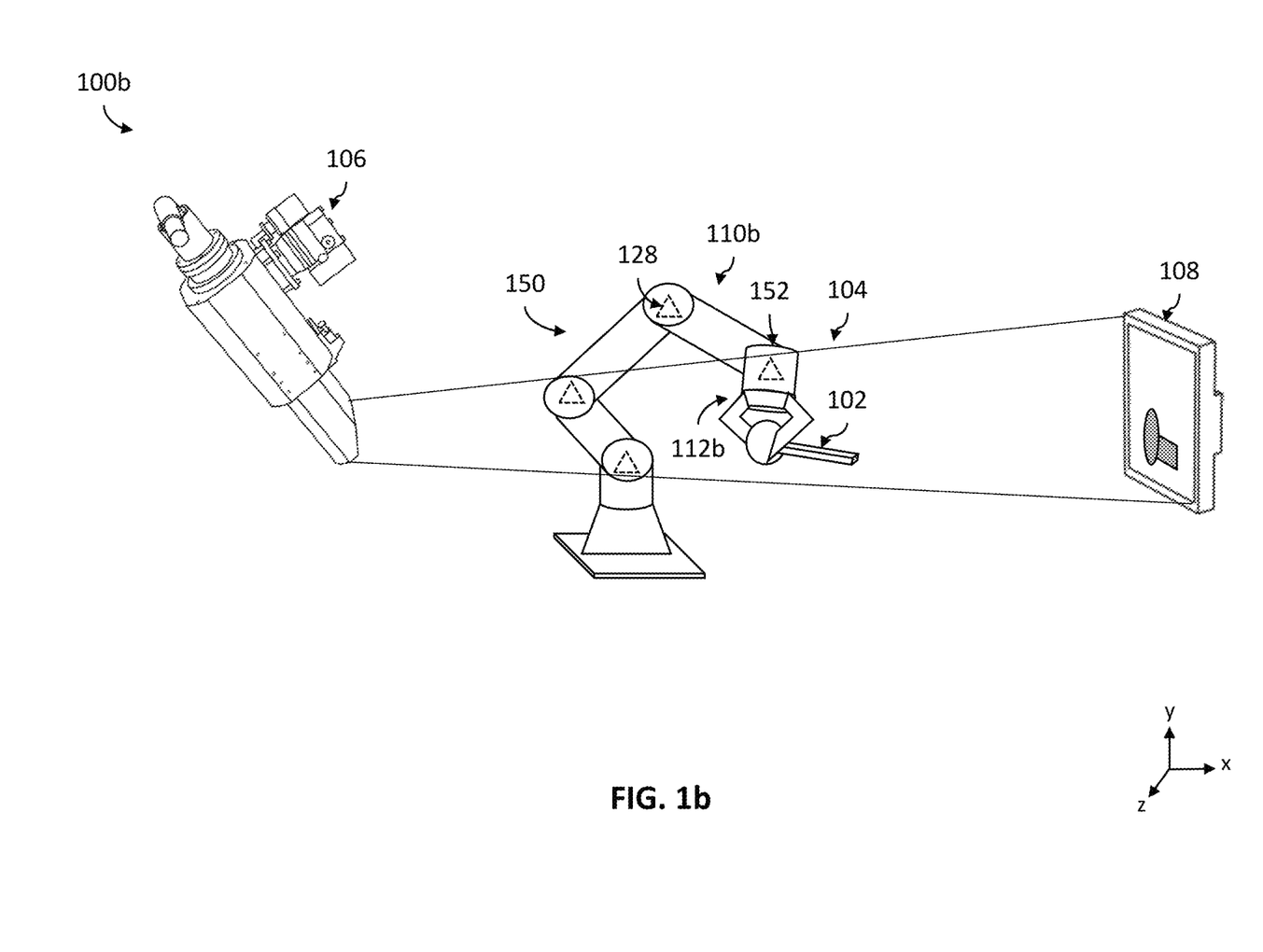
FIG. 1B shows another example of an industrial x-ray radiography machine, in accordance with aspects of this disclosure.

FIG. 1B shows an example of an alternative X-ray radiography machine 100b. The alternative X-ray radiography machine 100b is the same as the X-ray radiography machine 100a except that the alternative X-ray radiography machine 100 includes a robotic positioner 110b instead of the positioner 110a.

In the example of FIG. 1B, the robotic positioner 110b comprises a robotic arm 150 with several segments interconnected by joints that allow the robotic arm 150 to move in several degrees of freedom. For example, each joint may have one or more degrees of freedom, to allow the robotic arm to achieve multiple orientations. The robotic positioner 110 further includes a robotic wrist 152 at the end of the robotic arm 150, and an alternative robotic fixture 112b attached to the wrist 152 at the end of the robotic arm 150.

In the example of FIG. 1B, the robotic positioner 110 further includes several actuators 128 (e.g., motors) configured to move the robotic positioner 110 and/or rotate the wrist 152 and/or rotatable fixture 112. As shown, the alternative rotatable fixture 112b is a gripper rather than a plate. The alternative rotatable fixture 112b holds the part 102 such that the part 102 may be rotated via the alternative rotatable fixture 112b (and/or the wrist 152 to which the alternative rotatable fixture 112b is fitted).

In some examples, the robotic wrist 152 may include a spindle 116 and/or motor 114 configured to rotate the rotatable fixture 112b, similar to that which is shown in the arm 120 of the positioner 110a of FIG. 1a. In some examples, the alternative rotatable fixture 112b may be a different type of fixture, such as, for example, a magnetic fixture. In some examples, the robotic positioner 110b (and/or its wrist 152) may be configured for attachment to a variety of different alternative rotatable fixtures 112b.

Figure 2:
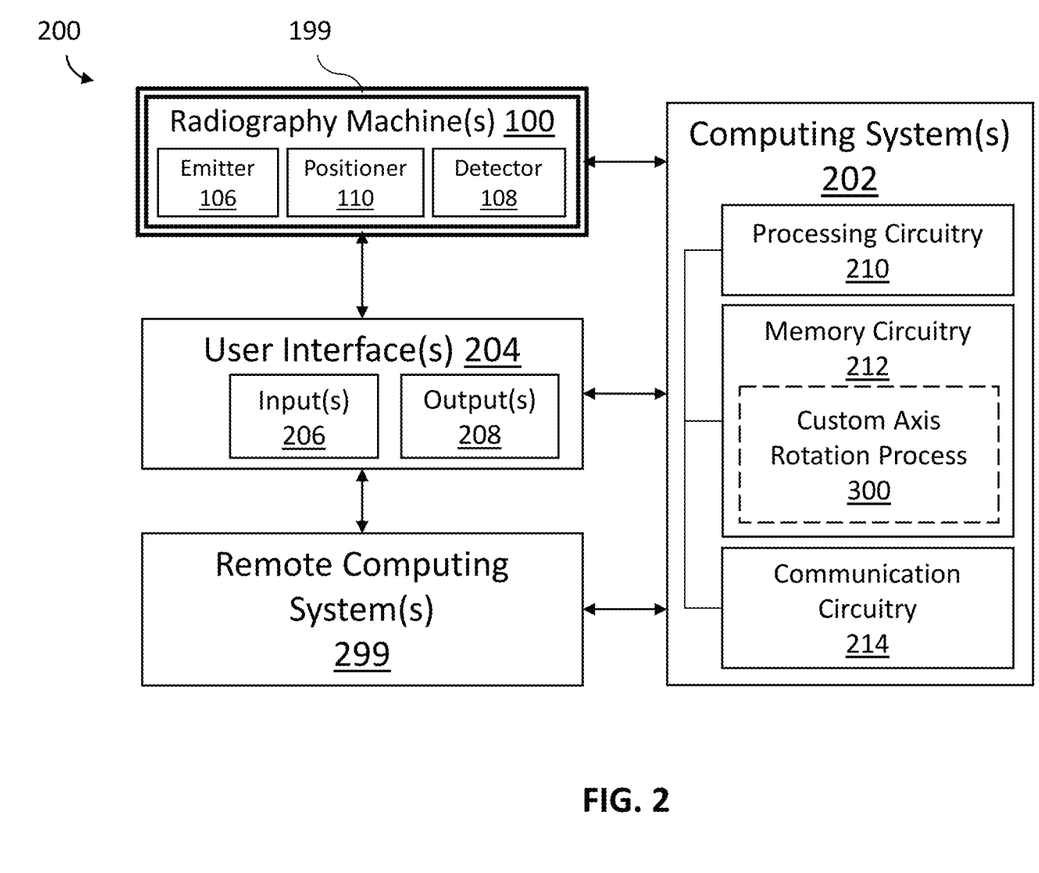
FIG. 2 is a block diagram showing an example industrial x-ray radiography system having the industrial x-ray radiography machine of FIG. 1a and/or 1b, in accordance with aspects of this disclosure.

FIG. 2 shows an example of an X-ray radiography system 200. As shown, the X-ray radiography system 200 includes an X-ray radiography machine 100, a computing system 202, a user interface (UI) 204, and a remote computing system 299. While only one X-ray radiography machine 100, computing system 202, UI 204, and remote computing system 299 are shown in the example of FIG. 2, in some examples the X-ray radiography system 200 may include several X-ray radiography machines 100, computing systems 202, UIs 204, and/or remote computing systems 299.

In the example of FIG. 2, the X-ray radiography machine 100 has an emitter 106, detector 108, and positioner 110 enclosed within a housing 199. As shown, the X-ray radiography machine 100 is connected to and/or in communication with the computing system(s) 202 and UI(s) 204. In some examples, the X-ray radiography system 100 may also be in electrical communication with the remote computing system(s) 299. In some examples, the communications and/or connections may be electrical, electromagnetic, wired, and/or wireless.

In the example of FIG. 2, the UI 204 includes one or more input devices 206 and/or output devices 208. In some examples, the one or more input devices 206 may comprise one or more touch screens, mice, keyboards, buttons, switches, slides, knobs, microphones, dials, and/or other electromechanical input devices. In some examples, the one or more output devices 208 may comprise one or more display screens, speakers, lights, haptic devices, and/or other devices. In some examples, a user may provide input to, and/or receive output from, the X-ray radiography machine(s) 100, computing system(s) 202, and/or remote computing system(s) 299 via the UI(s) 204.

In some examples, the UI(s) 204 may be part of the computing system 202. In some examples, the computing system 202 may implement one or more controllers of the X-ray radiography machine(s) 100. In some examples, the remote computing system(s) 299 may be similar or identical to the computing system 202.

In the example of FIG. 2, the computing system 202 is in (e.g., electrical) communication with the X-ray radiography machine(s) 100, UI(s) 204, and remote computing system(s) 299. In some examples, the communication may be direct communication (e.g., through a wired and/or wireless medium) or indirect communication, such as, for example, through one or more wired and/or wireless networks (e.g., local and/or wide area networks). As shown, the computing system 202 includes processing circuitry 210, memory circuitry 212, and communication circuitry 214 interconnected with one another via a common electrical bus.

In some examples, the processing circuitry 210 may comprise one or more processors. In some examples, the communication circuitry 214 may include one or more wireless adapters, wireless cards, cable adapters, wire adapters, radio frequency (RF) devices, wireless communication devices, Bluetooth devices, IEEE 802.11-compliant devices, WiFi devices, cellular devices, GPS devices, Ethernet ports, network ports, lightning cable ports, cable ports, etc. In some examples, the communication circuitry 214 may be configured to facilitate communication via one or more wired media and/or protocols (e.g., Ethernet cable(s), universal serial bus cable(s), etc.) and/or wireless mediums and/or protocols (e.g., near field communication (NFC), ultra high frequency radio waves (commonly known as Bluetooth), IEEE 802.11x, Zigbee, HART, LTE, Z-Wave, WirelessHD, WiGig, etc.).

In the example of FIG. 2, the memory circuitry 212 comprises and/or stores a custom axis rotation process 300. In some examples, the custom axis rotation process 300 may be implemented via machine readable (and/or processor executable) instructions stored in memory circuitry 212 and/or executed by the processing circuitry 210. In some examples, the custom axis rotation process 300 may control a positioner 110 of the radiography machine(s) 100 to translate the rotatable fixture 112 so that, as the rotatable fixture 112 rotates, the part 102 is rotated about a custom axis that is offset from an actual rotational axis of a rotatable fixture 112.

Figure 3:
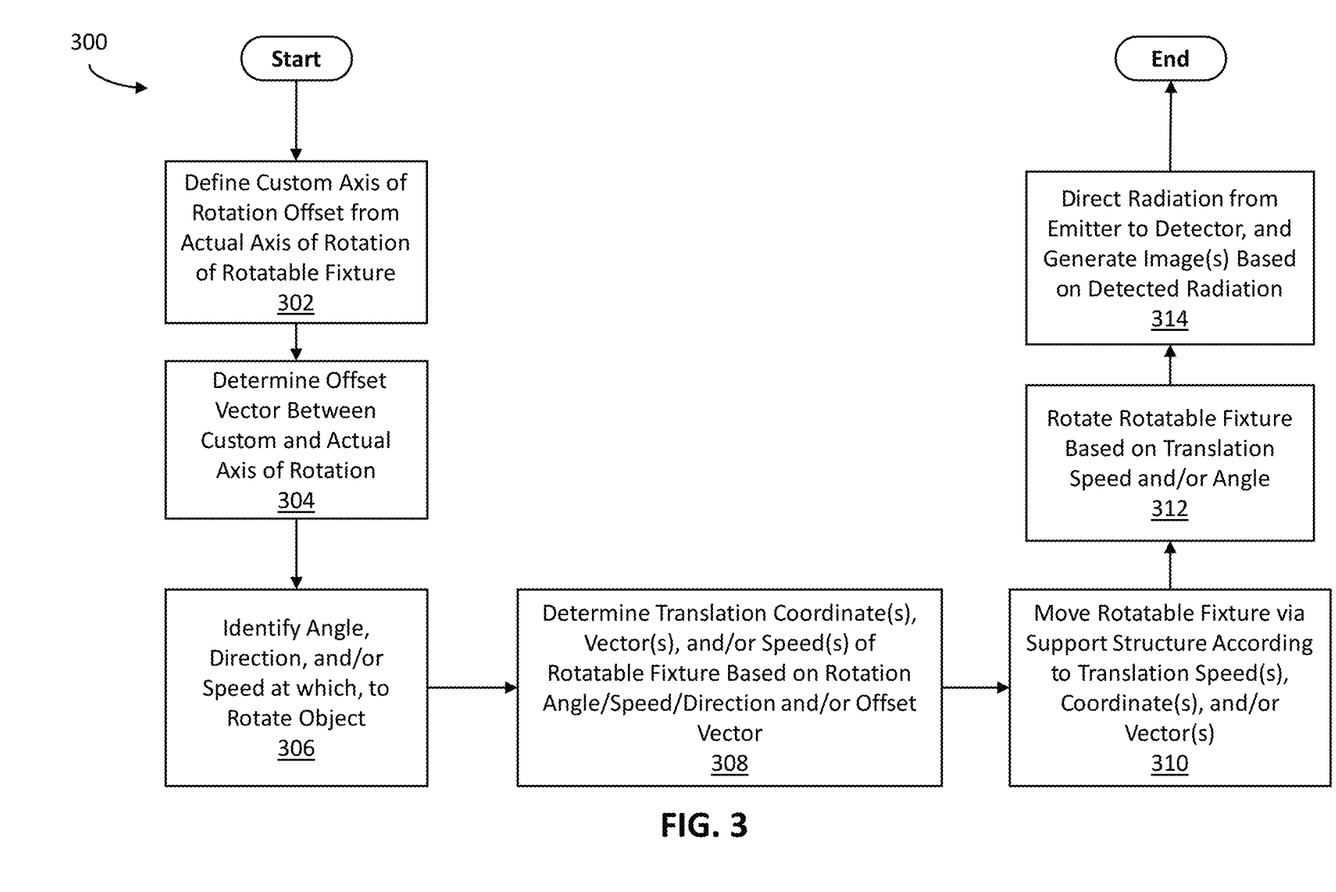
FIG. 3 is a flowchart illustrating operation of an example custom axis rotation process, in accordance with aspects of this disclosure.

FIG. 3 is a flowchart illustrating example operation of the custom axis rotation process 300. In the example of FIG. 3, the custom axis rotation process 300 begins at block 302. At block 302, a custom axis 404 is defined (as shown, for example, in FIGS. 4a-4e).

In some examples, the custom axis 404 may be defined directly by a user (e.g., through user input received via the UI(s) 204). In some examples, the custom axis 404 may be defined automatically by the custom axis rotation process 300, such as, for example, based on known (and/or user entered) measurements of the part 102 and/or components of the radiography machine 100. In some examples, the custom axis rotation process 300 may define the custom axis 404 based on analysis of user input.

For example, the radiography system 200 may generate two or more different 2D images via the radiography machine 100, with the part 102 at a different (e.g., off-centered) rotational orientation in each image. A user then may select a point in each of the two or more 2D images. Thereafter, the custom axis rotation process 300 may define two or more planes, with each plane extending through the emitter 106 and a different point of the two or more points. Finally, the custom axis rotation process 300 may define the custom axis 404 as the intersection of the two or more planes.

In some examples, the custom axis 404 may be a line and/or vector. In some examples, the custom axis 404 of rotation may be parallel to an actual axis 402 of rotation of the rotatable fixture 112 (e.g., defined by the spindle 116). In some examples, the custom axis 404 may be defined to extend through an approximate (e.g., within an error of 5 or 10%) center of the part 102 (e.g., as measured in a plane approximately parallel to the x axis). In some examples, the custom axis 404 may be defined in terms of (and/or relative to) a coordinate system, world space, virtual environment, and/or other framework that facilitates position/location determinations. In some examples, the custom axis rotation process 300 may also define the actual axis 402 of rotation of the rotatable fixture 112 using the same framework (e.g., according to known and/or user entered information).

In the example of FIG. 2, the custom axis rotation process 300 proceeds to block 304 after block 302. At block 304, the custom axis rotation process 300 determines an offset vector 406 extending between the defined custom axis 404 of rotation and the actual axis 402 of rotation of the rotatable fixture 112 (as shown, for example, in FIGS. 4a-4e). In some examples, the offset vector 406 may be representative of a distance (and/or direction) between the custom axis 404 and actual axis 402 of rotation. In some examples, the offset vector 406 may be (and/or lie in a plane that is) perpendicular (and/or normal, orthogonal, etc.) to both the custom axis 404 and actual axis 402 of rotation.

Figure 4A:
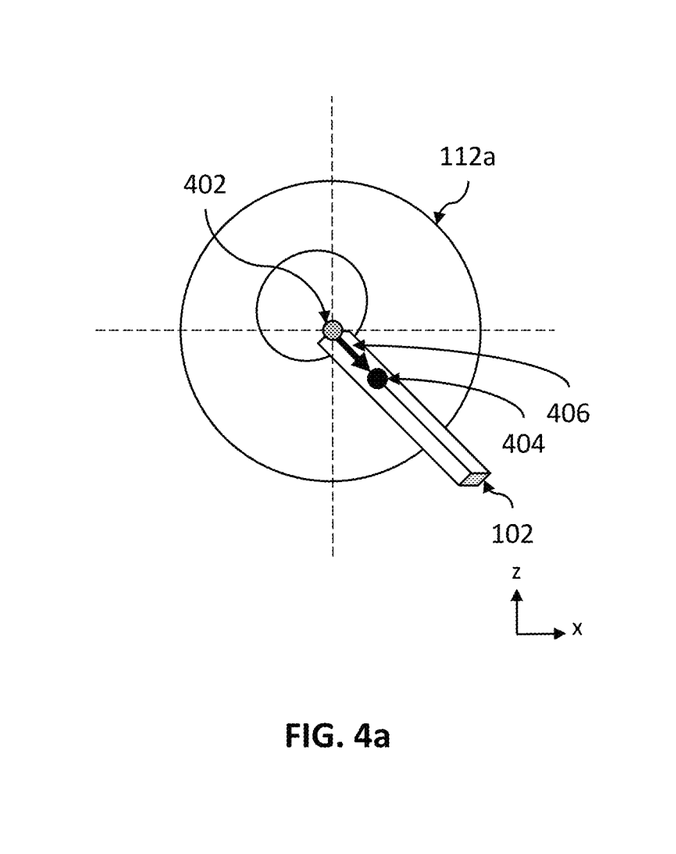
FIGS. 4a-4b illustrate off-center rotation of a part about an actual axis of a fixture, in accordance with aspects of this disclosure.

FIGS. 4a-4e are top down views of the rotatable fixture 112a retaining the part 102. For the sake of clarity, other portions of the radiography machine 100a are omitted. FIG. 4a shows an example of the actual axis 402 of rotation of the rotatable fixture 112a, custom axis 404 of rotation, and an offset vector 406 extending from the actual axis 402 to the custom axis 404.

In the example of FIG. 4a, the actual axis 402 of rotation of the rotatable fixture 112 is different than (and/or offset from) the custom axis 404. While the actual axis 402 is at an approximate center of the rotatable fixture 112a, the custom axis 404 is at an approximate center of the part 102. However, the center of the part 102 is not aligned with the center of the rotatable fixture 112a.

The lack of alignment may be, for example, because the mass of the part 102 is unevenly distributed. If the majority of the mass of the part 102 is in the circular portion of the part 102, the circular portion (rather than the center of the part 102) may need to be placed more central to the rotatable fixture 112a in order to maintain balance. However, as discussed above, the lack of alignment between the center of the rotatable fixture 112a (e.g., the actual axis 402) and the center of the part 102 (e.g., the custom axis 404) can lead to issues.

Figure 4B:
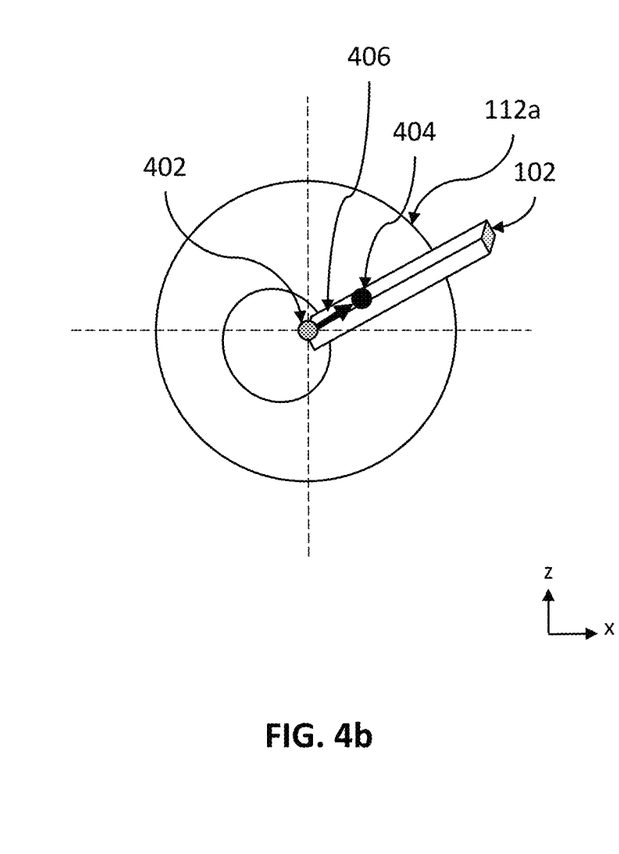

In the example of FIG. 4b, the rotatable fixture 112a has been rotated counterclockwise about its actual axis 402 of rotation. The part 102 has also been rotated as a result of the rotation of the rotatable fixture 112. However, while the actual axis 402 has not moved (as indicated by the crosshairs), the custom axis 404 (and the part 102) has been translated in the x and z axes. The translation of the part 102 due to the misalignment of the center of the part 102 and the center of the rotatable fixture 112a is an undesirable consequence that the custom axis rotation process 300 is designed to address.

In the example of FIG. 3, the custom axis rotation process 300 proceeds to block 306 after block 304. At block 306, the custom axis rotation process 300 identifies an angle or speed (e.g., angular velocity) at which to rotate the part 102. In some examples, a rotation direction (e.g., clockwise or counterclockwise) may also be identified.

In some examples, the custom axis rotation process 300 may use a default angle, speed, and/or direction stored in memory circuitry 212. In some examples, the angle, speed, and/or direction may be user provided (e.g., via UI(s) 204). For example, the particular angle, speed, and/or direction may be directly entered by the user.

In some examples, the angle, speed, and/or direction may be automatically determined by the custom axis rotation process 300 (e.g., based on user input). For example, the user may select to perform a "step" rotation, where the rotatable fixture 112 rotates the part 102 a set amount (and/or angle). In such an example, the user may select how many "steps" to take and the custom axis rotation process 300 may determine the angle, speed, and/or direction based on a stored/entered angle (and/or direction/speed) per step. In some examples, the custom axis rotation process 300 may additionally (or alternatively) determine the angle, speed, and/or direction based on the number of steps selected. In some examples, the number of steps selected may be determined by how long a "step" input 206 (e.g., button) is selected (e.g., 1 second of selection=1 step).

As another example, the user may select to continuously rotate the rotatable fixture 112 in a continuous "jog." In some examples, the "jog" may continue until a "stop" input is received or until a certain (e.g., stored and/or set) number of rotations have occurred (e.g., ¼, ½, 1, 2, 5, 10, etc.). In some examples, the speed of the jog may be based on a default stored value, be set directly by the user, and/or be determined based on how long a "jog" input 206 (e.g., button) is selected. In some examples, the user may select how long they want a particular (e.g., quarter, half, full) rotation to take, and the custom axis rotation process 300 may determine the appropriate speed based on the selection.

In the example of FIG. 3, the custom axis rotation process 300 proceeds to block 308 after block 306. At block 308, the custom axis rotation process 300 determines a translation of the rotatable fixture 112 based on the offset vector 406 (and/or custom axis 404 and/or actual axis 402) and the angle, speed, and/or direction identified at block 306. In some examples, the custom axis rotation process 300 may determine the translation based on the offset vector 406 and/or various trigonometric functions (e.g., sine, cosine, etc.) of the selected angle and/or angular velocity.

In some examples, the determined translation may be in the form of a coordinate (or set of coordinates) that identifies a new location to which the (e.g., center of the) rotatable fixture 112 should be moved in order to rotate the part 102 the identified angle, speed, and/or direction around the custom axis 404. In some examples, the translation may be in the form of a vector (or set of vectors) that identifies a distance and/or direction the rotatable fixture 112 should be moved in order to rotate the part 102 the identified angle, speed, and/or direction around the custom axis 404. In some examples, the determined translation may be in the form of a translation velocity (e.g., direction and/or speed) that the rotatable fixture 112 should be moved in order to rotate the part 102 the identified angle, speed, and/or direction around the custom axis 404. In some examples, the translation coordinate(s), vector(s), and/or velocity may lie in a plane that is normal (and/or perpendicular, orthogonal, etc.) to the custom axis 404 and/or the actual axis 402 of rotation.

In some examples, the translation may include a first translation (e.g., vector(s)/coordinate(s)/velocity) in a first axis (e.g., the X axis), and a second translation (e.g., vector(s)/coordinate(s)) in a second axis (e.g., the Z axis) that is perpendicular to the first axis. In such examples, both the first and second axes may lie in a plane that is normal (and/or perpendicular, orthogonal, etc.) to the custom axis 404 and/or the actual axis of rotation for the rotatable fixture 112. In some examples (e.g., corresponding to the radiography machine 100a), the first translation may correspond to movement of the rotatable fixture 112 (and/or support structure 118) along the floor 126 (and/or floor track 134) of the positioner 110a shown in FIG. 1, while the second translation may correspond to movement of the rotatable fixture 112 (and/or support structure 118) along the base 124 (and/or shelf track 132) of the positioner 110a. In some examples (e.g., corresponding to radiography machine 100b shown in FIG. 2), the translation(s) may be more complex, and/or may occur in more than two axes (though they may still ultimately result in first/second translations in first/second axes).

In the example of FIG. 3, the custom axis rotation process 300 proceeds to block 310 after block 308. At block 310, the custom axis rotation process 300 commands the positioner 110 to move the rotatable fixture 112 (e.g., via the support structure 118 and/or robotic arm 150) according to the translation determined at block 308. As shown, the custom axis rotation process 300 then proceeds to block 312 where the custom axis rotation process 300 rotates the rotatable fixture 112 according to the direction, angle, and/or speed identified at block 306. While shown as occurring in separate blocks 310 and 312 in the example of FIG. 3, in some examples, the translation and rotation of the rotatable fixture 112 may occur simultaneously. The combined translation and rotation of the rotatable fixture 112 in block 310 and block 312 results in a rotation of the part 102 around the custom axis 404.

In some examples, the custom axis rotation process 300 may command (and/or the positioner 110 may execute) the rotation and/or translation of block 310 and/or block 312 in such a way that at least the distance portion of the offset vector 406 remains approximately (e.g., within 5 and/or 10%) constant. While the direction portion of the offset vector 406 may necessarily change as the rotatable fixture 112 is rotated, a constant offset distance may give the perception (e.g., to an observing user) that the part 102 is being rotated about the custom axis 404 in a smooth, coordinated movement. In some examples, the custom axis rotation process 300 may dynamically adjust the speed of movement of the support structure 110 in a particular axis (and/or rotation of the rotatable fixture 112) to give the appearance of a smooth, coordinated movement. This may be especially desirable during "jog" motions, where the intent is to have continuous rotation that is at all times centered on the custom axis 404.

If, in contrast, the offset distance is not held constant (and/or allowed to variate), then the rotation of the part 102 about the custom axis 404 may be accomplished with uncoordinated movements. While the movements may eventually result in a rotation about the custom axis 404, they may not appear to be rotating about the custom axis 404 in the interim. Nevertheless, such uncoordinated movement (and/or non-constant offset distance) may be acceptable, or even desirable, in some examples.

For example, it may be simpler to implement the custom axis rotation process 300 if the offset distance is allowed to change during rotation and/or translation. In some examples, the custom axis rotation process 300 may operate faster when the offset distance is allowed to change during rotation and/or translation, and/or may preserve computational power that would otherwise be required to coordinate the movement. In some examples, allowing the offset distance to change during rotation and/or translation may also increase the precision at which the part 102 can be rotated about the custom axis 404 (e.g., at a particular angle).

In the example of FIG. 3, the custom axis rotation process 300 proceeds to block 314 after block 312. At block 314, the custom axis rotation process 300 commands the emitter 106 to direct X-ray radiation 104 through the part 102 to the detector 108. The custom axis rotation process 300 then generates one or more 2D and/or 3D images based on the radiation received at the detector 108. In some examples, a 3D image of the part 102 may be generated using several 2D images generated at different rotational orientations of the part 102. While shown as ending after block 314, in some examples, the custom axis rotation process 300 may instead return to block 302 or 306 after block 314.

Figure 4C:
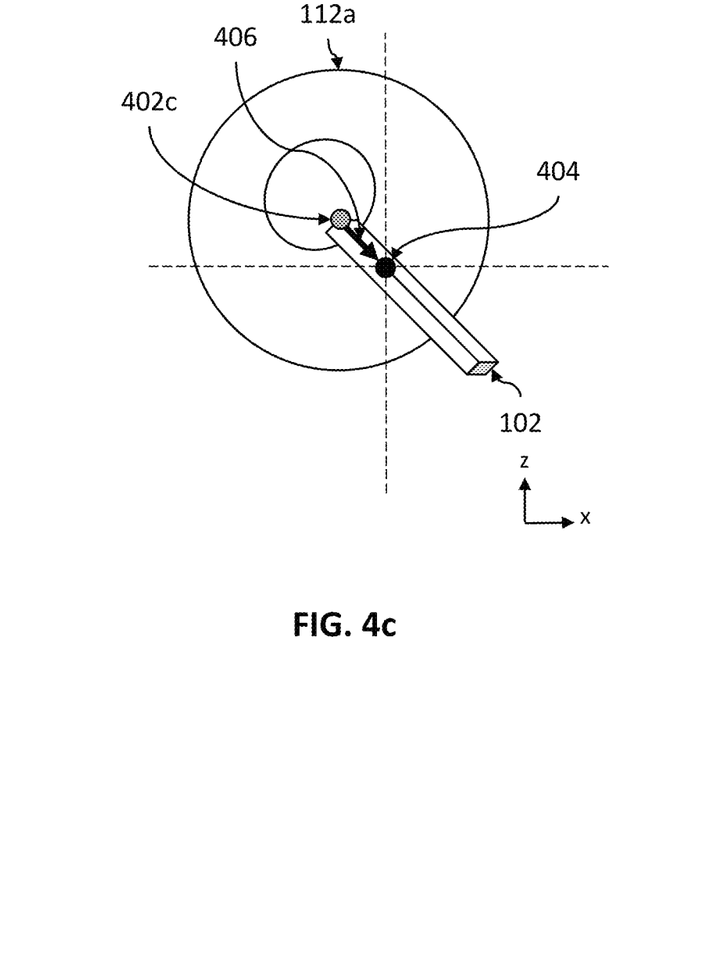
FIGS. 4c-4e illustrate centered rotation of a part about a custom axis that is offset from the actual axis of the fixture, via the custom axis rotation process of FIG. 3, in accordance with aspects of this disclosure.
Figure 4D:
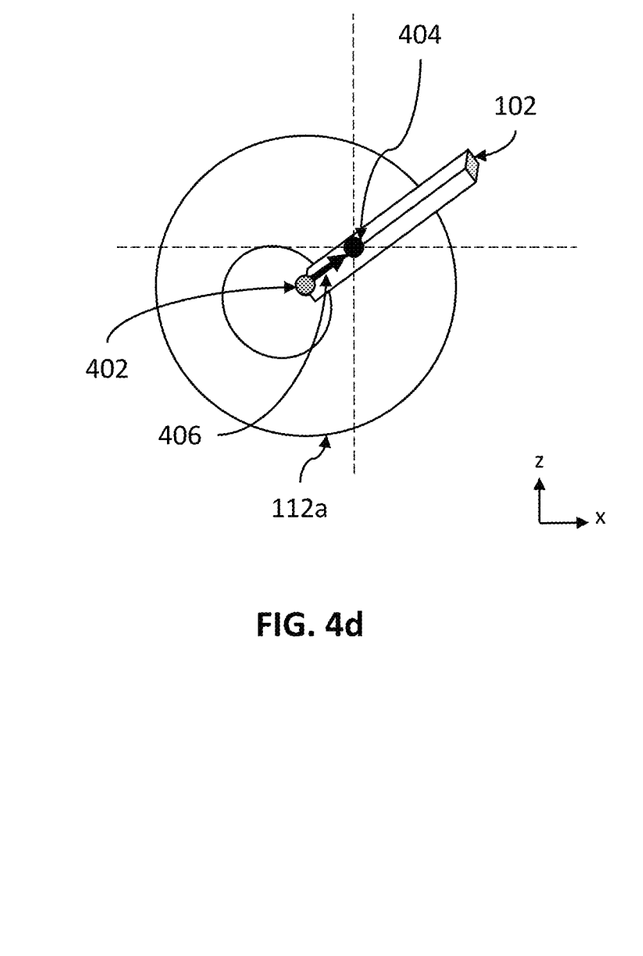
Figure 4E:
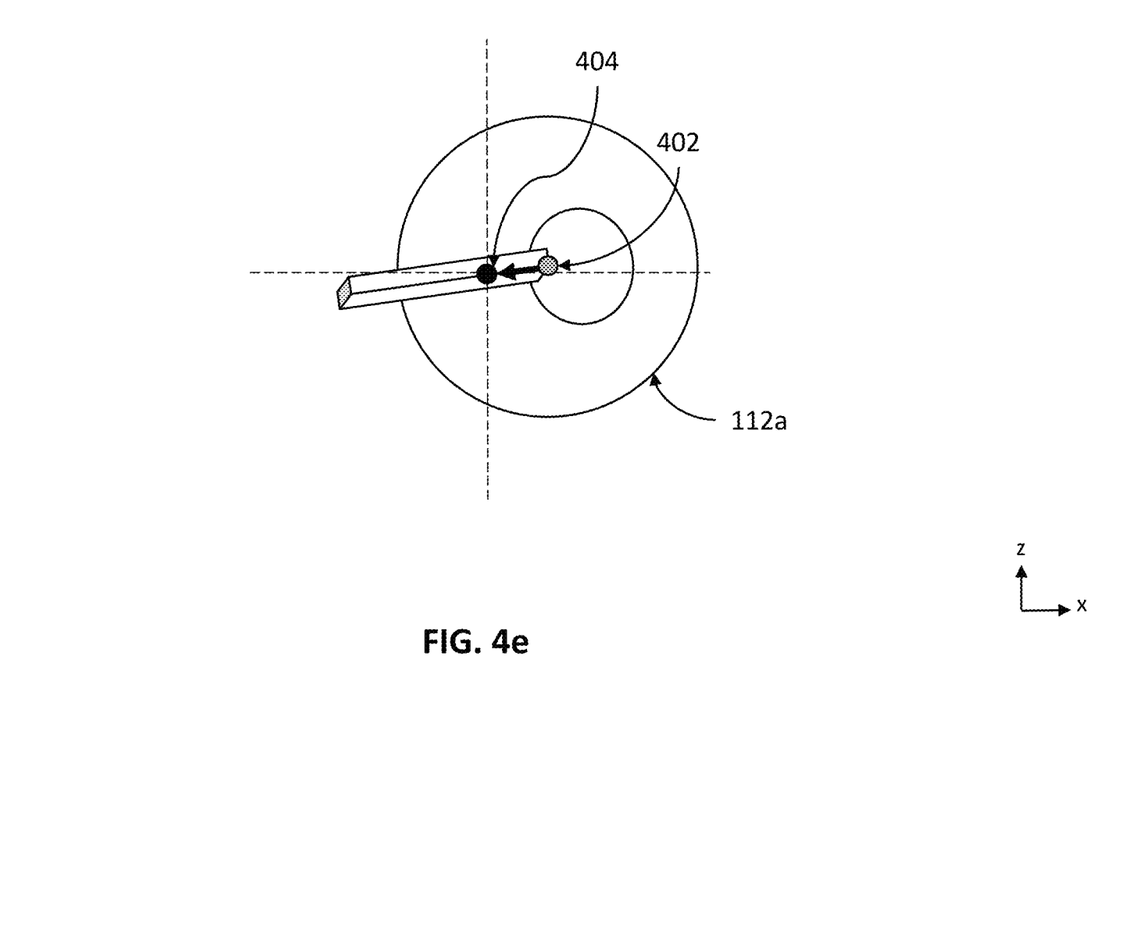

FIGS. 4c-4e show an example of a rotation of the part 102 about a custom axis 404 (e.g., via the translations of the custom axis rotation process 300). FIG. 4c shows a starting position of the rotatable fixture 112, part 102, actual axis 402, custom axis 404, and offset vector 406 that is similar to that which is shown in FIG. 4a. In contrast to FIG. 4a, however, FIG. 4c shows the cross-hairs at the custom axis 404, rather than the actual axis 402, indicating that the rotation will be centered on an unmoving custom axis 404, rather than an unmoving actual axis 402.

In the example of FIG. 4d, the rotatable fixture 112a (and/or the actual axis 402) has been translated down in the negative z direction, and rotated about its actual axis 402 counterclockwise to rotate the part 102 counterclockwise about the custom axis 404. As shown, the angle the rotatable fixture 112a (and/or part 102) has been rotated is the same as the angle between the new and old offset vectors 406 (of FIGS. 4c and 4d, respectively). The custom axis 404 has not moved (as indicated by the cross-hairs) since the rotatable fixture 112 has been translated, rather than the part 102 (opposite to the example of FIG. 4b).

FIG. 4e shows an additional rotation about the custom axis 404 via an additional translation and rotation of the rotatable fixture 112. As shown, the rotatable fixture 112 has been further translated up and to the right, in the positive z and x directions, and rotated about its actual axis 402 counterclockwise. In some examples, a further rotation of the part 102 about the custom axis 404 might result in the rotatable fixture 112 being translated back to its original position in FIG. 4c.

The custom axis rotation process 300 allows the radiography system 200 to define a custom axis 404, and rotate a part 102 about the custom axis 404. This may be valuable, especially where it is difficult, impractical, and/or impossible to align the center of the part 102 with the center (and/or actual axis 402) of the rotatable fixture 112. The custom axis rotation process 300 may be applied to existing radiography machines 100 without requiring physical alteration of the radiography machines 100, integration of new components into the radiography machines 100, and/or risk of instability to the part 102 and/or the radiography machines 100.

The present methods and/or systems may be realized in hardware, software, or a combination of hardware and software. The present methods and/or systems may be realized in a centralized fashion in at least one computing system, or in a distributed fashion where different elements are spread across several interconnected computing and/or remote computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more instructions (e.g., lines of code) executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor.

What is claimed is:

1. A method of rotating an object around a custom axis of rotation in an industrial radiography system, the method comprising:
  directing first radiation from a radiation emitter of the industrial radiography system, through an object, to a radiation detector of the industrial radiography system while the object is at a first orientation relative to the radiation emitter or the radiation detector;
  generating a first image of the object at the first orientation based on the first radiation detected by the radiation detector;
  receiving a first selection of a first user selected point in the first image of the object via a user interface of the industrial radiography system;
  identifying a first plane defined by the radiation emitter and the first user selected point in the first image;
  rotating the object to a second orientation via a rotatable fixture of the industrial radiography system;
  directing second radiation from the radiation emitter through the object and onto the radiation detector while the object is at the second orientation;
  generating a second image of the object at the second orientation based on the second radiation detected by the radiation detector;
  receiving a second selection of a second user selected point in the second image via the user interface;
  identifying a second plane defined by the radiation emitter and the second user selected point in the second image;
  defining a custom axis of rotation as a line extending through an intersection of the first plane the second plane, the custom axis being offset from an actual axis of rotation about which the rotatable fixture configured to retain the object is configured to rotate;
  determining an offset vector extending between the custom axis of rotation and the actual axis of rotation along a plane that is normal to both the custom axis of rotation and the actual axis of rotation, the offset vector comprising an offset distance and an offset direction;
  identifying an angle to which, or an angular velocity at which, to rotate the object about the custom axis;
  determining a translation of the rotatable fixture in the plane normal to the custom axis of rotation based on the offset vector and the angle, or the offset vector and the angular velocity;
  moving the rotatable fixture in the plane based on the translation; and
  rotating the rotatable fixture around the actual axis based on the angle or the angular velocity.

2. The method of claim 1, wherein the custom axis of rotation is parallel to the actual axis of rotation.

3. The method of claim 1, wherein the rotatable fixture is moved or rotated using a robotic arm or a robotic wrist.

4. The method of claim 1, wherein the translation comprises a first translation, and the effective rotation comprises a first effective rotation, the method further comprising:
  directing third radiation from the radiation emitter of the industrial radiography system, through the object, to the radiation detector of the industrial radiography system, after the first effective rotation of the object around the custom axis;
  determining a second translation of the rotatable fixture;
  moving the rotatable fixture in the plane based on the second translation; and
  rotating the rotatable fixture around the actual axis, wherein the second translation of the rotatable fixture in the plane, and the rotation of the rotatable fixture around the actual axis, results in the offset distance fluctuating during the second effective rotation of the object around the custom axis; and
  directing fourth radiation from the radiation emitter, through the object, to the radiation detector, after the second effective rotation of the object around the custom axis, the offset distance after the first effective rotation being equal to the offset distance after the second effective rotation.

5. The method of claim 1, wherein moving the rotatable fixture in the plane comprises moving the rotatable fixture via a support structure that retains the rotatable fixture.

6. The method of claim 1, further comprising directing third radiation from the radiation emitter of the industrial radiography system, through the object, to the radiation detector of the industrial radiography system.

7. The method of claim 6, wherein the third radiation is X-ray radiation.

8. The method of claim 6, further comprising generating a two dimensional image of the object based on the third radiation detected by the radiation detector.

9. The method of claim 8, further comprising generating a three dimensional image of the object based on the two dimensional image of the object and a plurality of other two dimensional images of the object.

10. The method of claim 1, wherein the first plane and the second plane are parallel to an actual axis of rotation of the rotatable fixture.

* * * * *